United States Patent
Imahigashi (10) Patent No.: US 9,890,789 B2
(45) Date of Patent: Feb. 13, 2018

(54) FAN FOR AIR CONDITIONER

(71) Applicant: DENSO CORPORATION, Kariya, Aichi-pref. (JP)

(72) Inventor: Shouichi Imahigashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 378 days.

(21) Appl. No.: 14/760,019

(22) PCT Filed: Jan. 8, 2014

(86) PCT No.: PCT/JP2014/000028
§ 371 (c)(1),
(2) Date: Jul. 9, 2015

(87) PCT Pub. No.: WO2014/109286
PCT Pub. Date: Jul. 17, 2014

(65) Prior Publication Data
US 2015/0361989 A1 Dec. 17, 2015

(30) Foreign Application Priority Data
Jan. 10, 2013 (JP) ................................. 2013-002781

(51) Int. Cl.
*F04D 29/28* (2006.01)
*F04D 29/08* (2006.01)
(Continued)

(52) U.S. Cl.
CPC ....... *F04D 29/083* (2013.01); *B60H 1/00471* (2013.01); *F04D 17/08* (2013.01);
(Continued)

(58) Field of Classification Search
CPC ...... F04D 29/083; F04D 17/08; F04D 25/166; F04D 29/162; F04D 29/281; F04D 29/4226; F04D 29/663; B60H 1/00471
(Continued)

(56) References Cited

U.S. PATENT DOCUMENTS 5,857,905 A * 1/1999 Uemura ............. B60H 1/00064
165/42
5,957,769 A * 9/1999 Miyata ............... B60H 1/00457
454/139
(Continued)

FOREIGN PATENT DOCUMENTS

JP H10071828 A 3/1998
JP 2001213134 A 8/2001
(Continued)

OTHER PUBLICATIONS

International Search Report and Written Opinion (in Japanese with English Translation) for PCT/JP2014/000028, dated Apr. 15, 2014; ISA/JP.

*Primary Examiner* — Aaron R Eastman
(74) *Attorney, Agent, or Firm* — Harness, Dickey & Pierce, P.L.C.

(57) ABSTRACT

A first fan is disposed in a first air passage, and a second fan is disposed in a second air passage. A partition wall that divides inside of a casing into the first air passage and the second air passage has an inclination part that is inclined toward the second fan as extending outward in a radial direction. The second fan has an end portion located adjacent to the first fan in a rotation axis direction and a projection part projected from the end portion outward in the radial direction. The inclination part is provided to cover the projection part across a clearance.

5 Claims, 5 Drawing Sheets

(51) Int. Cl.
    *F04D 25/16*     (2006.01)
    *F04D 29/16*     (2006.01)
    *B60H 1/00*     (2006.01)
    *F04D 17/08*     (2006.01)
    *F04D 29/42*     (2006.01)
    *F04D 29/66*     (2006.01)

(52) U.S. Cl.
    CPC ......... *F04D 25/166* (2013.01); *F04D 29/162* (2013.01); *F04D 29/281* (2013.01); *F04D 29/4226* (2013.01); *F04D 29/663* (2013.01)

(58) Field of Classification Search
    USPC .................................. 415/206; 454/121, 139
    See application file for complete search history.

(56) References Cited

U.S. PATENT DOCUMENTS

| | | | |
|---|---|---|---|
| 6,110,035 A * | 8/2000 | Uemura ............. | B60H 1/00064 454/121 |
| 6,119,463 A * | 9/2000 | Bell ................... | B60H 1/00471 165/86 |
| 6,142,864 A | 11/2000 | Uemura et al. | |
| 2002/0092308 A1* | 7/2002 | Bell ................... | B60H 1/00471 62/3.7 |

FOREIGN PATENT DOCUMENTS

| | | | |
|---|---|---|---|
| JP | 2002127729 A | 5/2002 | |
| JP | 2010100108 A | 5/2010 | |

\* cited by examiner

FAN FOR AIR CONDITIONER

CROSS REFERENCE TO RELATED APPLICATIONS

This application is a U.S. National Phase Application under 35 U.S.C. 371 of International Application No. PCT/JP2014/000028 filed on Jan. 8, 2014 and published in Japanese as WO 2014/109286 A1 on Jul. 17, 2014. This application is based on and claims the benefit of priority from Japanese Patent Application No. 2013-2781 filed on Jan. 10, 2013. The entire disclosures of all of the above applications are incorporated herein by reference.

TECHNICAL FIELD

The present disclosure relates to a fan for an air conditioner.

BACKGROUND ART

In a conventional air-conditioner for a vehicle, a centrifugal fan is provided in a casing having a scroll shape at each upstream part of two passages. The centrifugal fans are arranged in the rotation axis direction through a predetermined space, and are rotated integrally by one electric motor. The casing includes a partition wall having a plate shape to divide the internal air passage into two, in order to form two passages. In such a conventional air-conditioner for a vehicle, a leak flow of air may be generated, which leaks from one passage to the other passage. The leak flow may cause disorder in the flow within the scroll casing, such that noise may increase and that ventilation efficiency may fall.

Patent literature 1 and Patent literature 2 adopt a labyrinth structure to raise the sealing property between two fans. However, the labyrinth structure increases the cost with many manufacture subjects. Moreover, the labyrinth structure cannot completely stop air leak. If the leak flow flows into one passage, and if the leak flow collides to a turning flow produced by a main flow ejected from a fan in the one passage, noise may increase by unstable flow in the scroll casing.

Patent literature 3 describes a structure in which a leak flow flowing into one passage is made to perpendicularly collide to an ejection flow ejected from a fan in the one passage. Thus, noise is reduced by fixing the leak flow in the collision state so as to comparatively stabilize the flow disturbed in the scroll casing by the collision.

PRIOR ART LITERATURES

Patent Literature

Patent Literature 1: JP H10-71828 A
Patent Literature 2: JP 2001-213134 A
Patent Literature 3: JP 2002-127729 A

SUMMARY OF INVENTION

In Patent literature 3, since the leak flow is positively made to collide perpendicularly, it cannot be said that a disorder is restricted from being generated in a flow. The disorder in the flow may cause noise and may lower the ventilation efficiency. Furthermore, since influence such as air curtain may be caused by the leak flow which intersects perpendicularly, the ventilation efficiency may fall.

The present disclosure is aimed to provide a fan for an air-conditioner that can reduce noise and resistance caused by leak flow from one passage to the other passage.

According to an aspect of the present disclosure, a fan for an air conditioner includes: a casing defining an air passage therein; a centrifugal type fan housed in the casing to draw air from both sides in a rotation axis direction; and a partition wall that divides inside of the casing into a first air passage and a second air passage in the rotation axis direction of the centrifugal type fan. The centrifugal type fan has at least a first fan disposed in the first air passage and a second fan disposed in the second air passage as plural fans. The first fan and the second fan are configured to be integrally driven by one motor. The second fan has an end portion located adjacent to the first fan in the rotation axis direction and a projection part projected from the end portion outward in a radial direction. The partition wall has an inclination part to cover the projection part across a clearance from the projection part. The inclination part is inclined toward the second fan in the rotation axis direction as extending outward in the radial direction, and guides air sent by the first fan from the first air passage to the second air passage.

Thus, the projection part is defined in the second fan. The projection part is provided at the end portion located adjacent to the first fan in the rotation axis direction and is projected outward in the radial direction. Moreover, the inclination part is defined in the partition wall to cover the projection part, and is distanced toward the first fan from the projection part. The inclination part is inclined toward the second fan as going outward in the radial direction. Since the first fan and the second fan are driven integrally by one motor, air is sent to both the first air passage and the second air passage when the motor drives.

The sent air collides to the inner wall in the casing, thereby producing a turning flow. The partition wall has the inclination part in the first air passage, and the inclination part is inclined relative to the radial direction. Therefore, the inclination part can be restricted from becoming resistance for the turning flow generated by the first fan in the first air passage. Moreover, leak flow flowing into the second air passage from the first air passage passes between the inclination part and the projection part, and is guided by the inclination part outward in the radial direction inside the second air passage. Thus, the inclination part can be restricted from becoming resistance for air flow generated by the second fan to flow outward in the radial direction in the second air passage. Therefore, noise and resistance resulting from the leak flow can be reduced.

DESCRIPTION OF EMBODIMENTS

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A first embodiment is described with reference to FIGS. 1-7. An indoor unit of an air-conditioner for a vehicle is roughly divided into a fan unit 10 that sends air to a passenger compartment of the vehicle, and an air-conditioning unit (not shown) that controls temperature of the air sent from the fan unit 10. The indoor unit is arranged in a space between a dash panel which partitions the passenger compartment from an engine compartment and an instrument panel (meter board) at the foremost part in the passenger compartment.

An air passage is defined inside of the air-conditioning unit which is not illustrated, and the air sent from the fan unit 10 flows through the air passage. A cooling heat exchanger for cooling the air to be sent into the passenger compartment, a heating heat exchanger for reheating the air cooled by the cooling heat exchanger, and an air mixing door that adjust a flow rate of the cooled air to be reheated by the heating heat exchanger are arranged in the air passage.

The air controlled in the temperature within the air-conditioning unit is sent into the passenger compartment from a blow-off port provided in the passenger compartment through an opening defined at the most downstream of the air-conditioning unit in air flow and a duct.

The fan unit 10 integrally includes an inside/outside air switch device (not shown) which switchingly introduces inside air and/or outside air, and a fan 11 sending inside air and outside air introduced by the inside/outside air switch device toward the air-conditioning unit. In an example of FIG. 1, the inside/outside air switch device is arranged on the upper side, and the fan 11 is arranged on the lower side.

The fan 11 is a centrifugal fan that drives two fans, a first fan 13 and a second fan 14, to rotate by using one common fan motor 12 as a drive source. The fan motor 12 is an overhung motor in which the rotation shaft is projected to only one direction (first end side) of the main part. In an example of FIG. 1, the axial direction Y of the fan 11 (the rotation axis direction) corresponds to the up-and-down direction.

Either of DC motor and AC motor may be adopted as the fan motor 12. Operation of the fan motor 12 is controlled by a control signal (such as control voltage or control frequency signal) outputted from an air-conditioning control device (not shown).

The first fan 13 and the second fan 14 correspond to a centrifugal multi-blade fan (centrifugal type fan), that is single suction fan that draws air from the one end side in the axial direction Y. Specifically, the first fan 13 and the second fan 14 are configured by arranging plural blades annularly at a fixed interval around the rotation shaft of the fan motor 12. Each blade is formed integrally with a main plate 15, 16 having a disk shape, and the first fan 13 and the second fan 14 are disposed coaxially with each other. The first fan 13 draws air from the upper side, and the second fan 14 draws air from the lower side. Therefore, the main plate 15 of the first fan 13 is located on the lower side, and the main plate 16 of the second fan 14 is located on the upper side. In other words, an end portion of the first fan 13 adjacent to the second fan 14 in the rotation axis direction Y corresponds to the main plate 15 of the first fan 13. Similarly, an end portion of the second fan 14 adjacent to the first fan 13 in the rotation axis direction Y corresponds to the main plate 16 of the second fan 14. The first fan 13 and the second fan 14 are interpreted as one centrifugal type fan that draws air from the both sides in the rotation axis direction Y.

In this embodiment, since the fan motor 12 is located adjacent to the second fan 14, the inside diameter of the second fan 14 is made larger than the inside diameter of the first fan 13. Thus, the suction resistance on the side of the second fan 14 is restricted from becoming too large compared with the suction resistance on the side of the first fan 13.

The first fan 13 and the second fan 14 are rotatably housed respectively and separately in the first scroll casing 17 and the second scroll casing 18 (hereafter may be called as first casing and second casing respectively).

The first casing 17 defines the first air passage 17a inside with the spiral shape, and air blew off from the first fan 13 passes through the first air passage 17a. Specifically, the outer wall surface of the first casing 17 has a shape in which the distance from the rotation shaft (scroll radius) is gradually enlarged in the rotational direction of the first fan 13, when seen from a direction perpendicular to the rotation shaft. A first suction port 17b with circle shape is defined in a wall surface of the first casing 17 perpendicular to the rotation shaft and distanced from the fan motor 12 to draw air to the inner circumference side of the first fan 13. Moreover, a first blow-off port (not shown) for blowing off air is formed at the scroll end side of the air passage in the first casing 17.

The second casing 18 defines the second air passage 18a inside, and air blew off from the second fan 14 passes through the second air passage 18a, with a basis configuration that is the same as that of the first casing 17. Therefore, a second suction port 18b and a second blow-off port (not shown) are formed also in the second casing 18 similarly to the first casing 17. The second fan 14 is located adjacent to the fan motor 12 than the first fan 13 is, and the second suction port 18b is opened to face on the lower side.

Figure 1:
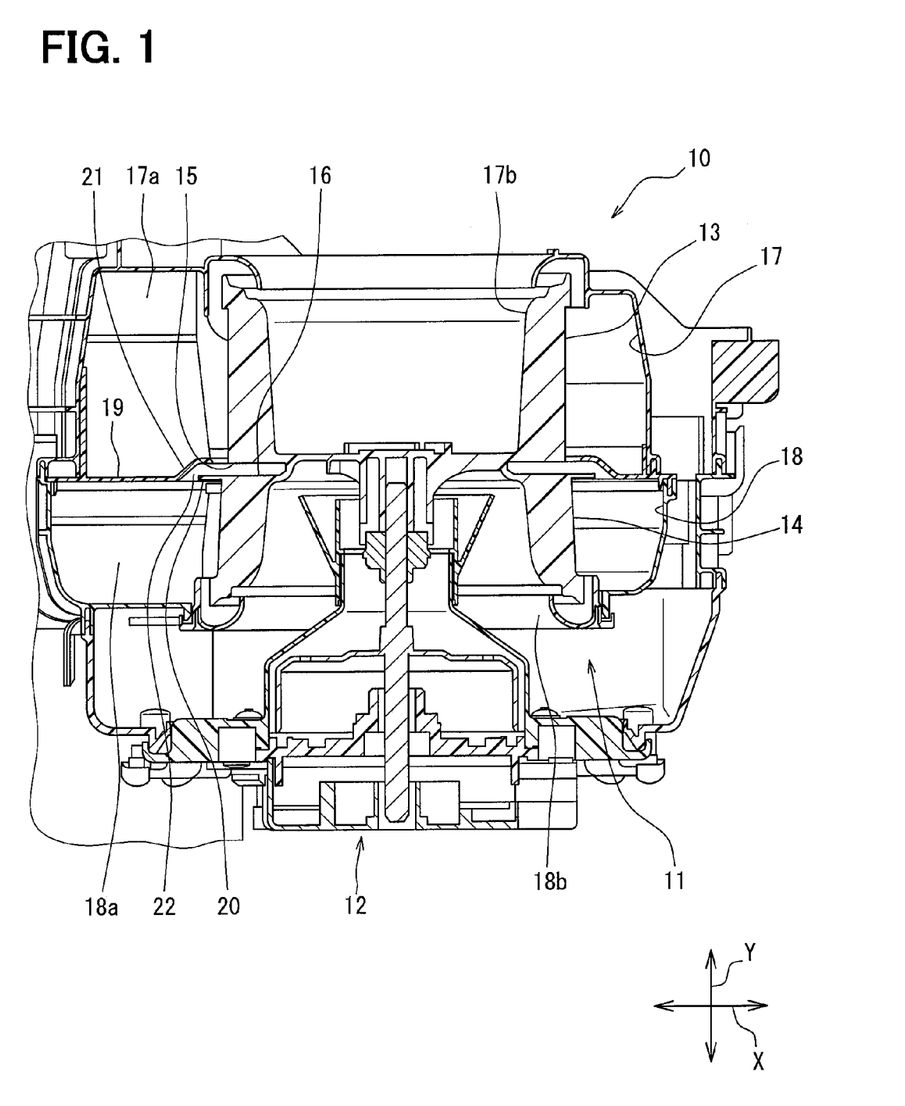
FIG. 1 is a sectional view illustrating a fan of a first embodiment.

The main plate 15 of the first fan 13 and the main plate 16 of the second fan 14 are arranged through a predetermined clearance in the rotation axis direction Y (the up-and-down direction of FIG. 1). Moreover, a partition wall 19 is formed in the boundary of the first casing 17 and the second casing 18. The partition wall 19 is formed to extend linearly from the boundary of the first casing 17 and the second casing 18 toward the inner side X2 in the radial direction X of each fan so as not to affect the rotation of the first fan 13 and the second fan 14. The first air passage 17a and the second air passage 18a are partitioned by the partition wall 19, such that air blew off from the first fan 13 and the air blew off from the second fan 14 are restricted from being mixed.

Figure 2:
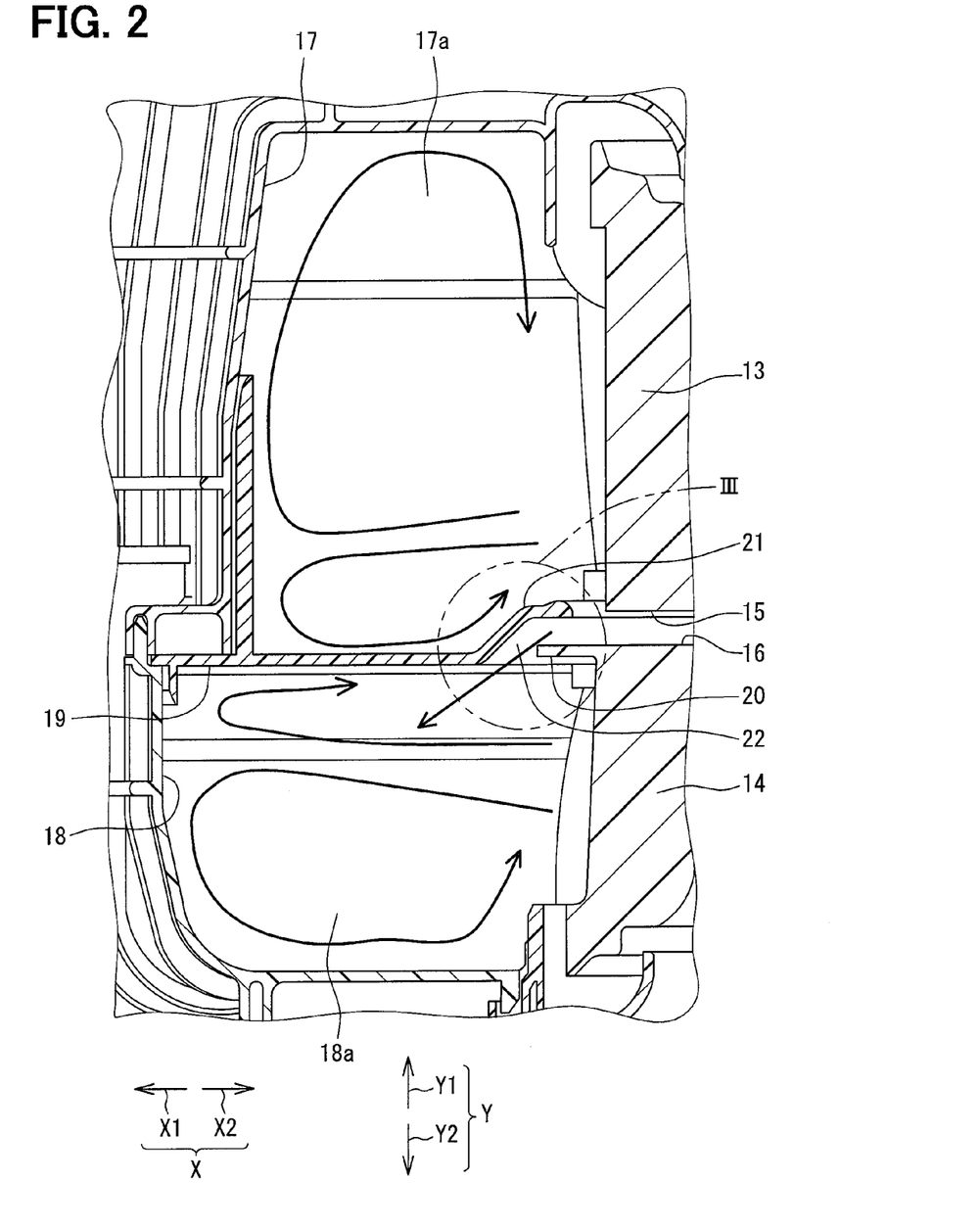
FIG. 2 is an enlarged sectional view of a part of the fan shown in FIG. 1.

As shown in FIG. 2, the second fan 14 has a projection part 20 projected to the outer side X1 in the radial direction X from the end portion located adjacent to the first fan 13 in the rotation axis direction Y. In other words, the projection part 20 is located on the upper side Y1 of the second fan 14 in the rotation axis direction Y. The projection part 20 is formed integrally with the main plate 16. In other words, the projection part 20 is defined at the end portion of the second fan 14 on the upper side Y1 in the rotation axis direction Y of each blade, and is projected from the blade on the outer side X1 in the radial direction X. Therefore, when seen as the whole, the projection part 20 is formed annularly.

As shown in FIG. 2, the partition wall 19 has an inclination part 21 distanced toward the first fan 13 from the projection part 20 in the rotation axis direction Y, and the inclination part 21 is provided to cover the projection part 20. The inclination part 21 is formed at the tip end of the partition wall 19, when the second fan 14 is seen from the inner wall of the second casing 18. In other words, the inclination part 21 is formed at the end portion of the partition wall 19 on the inner side X2 in the radial direction X. The inclination part 21 has a portion that is inclined to the lower side Y2 (downward in FIG. 2) in the rotation axis direction Y as extending to the outer side X1 (leftward in FIG. 2) in the radial direction X. A leak passage 22 is defined by the inclination part 21 and the projection part 20. The leak passage 22 guides air leaked from the first air passage 17a to the second air passage 18a.

Figure 3:
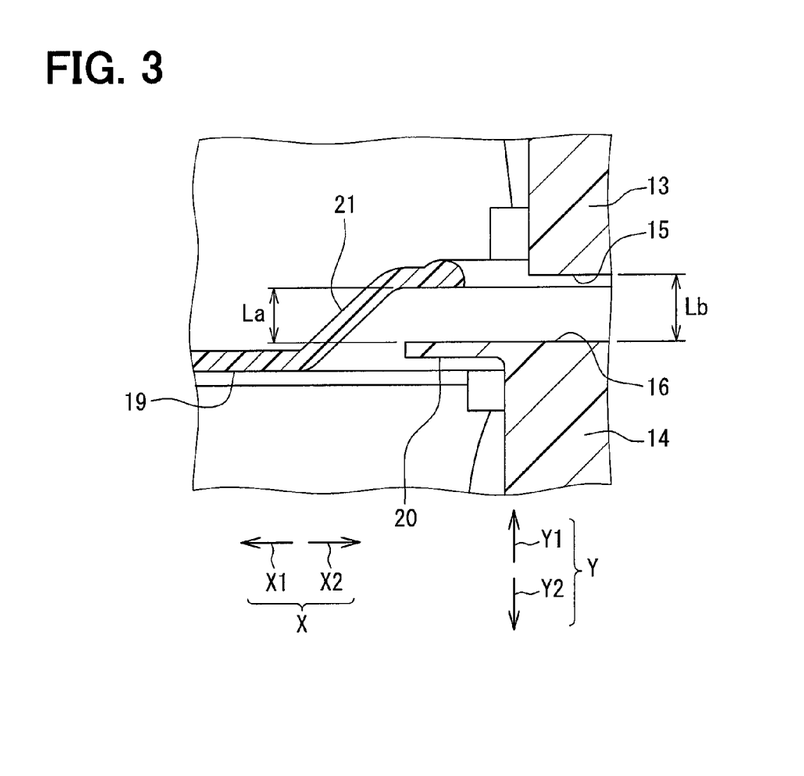
FIG. 3 is an enlarged sectional view of an area III of FIG. 2.
Figure 4:
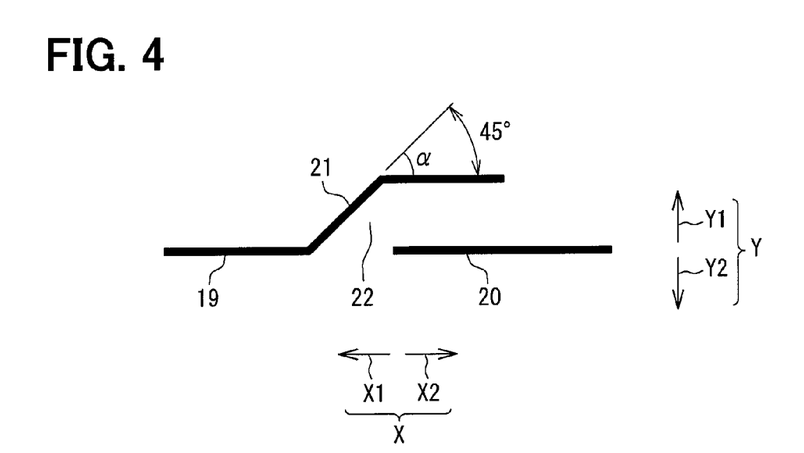
FIG. 4 is a schematic diagram in which an inclination angle of an inclination part is 45 degrees.
Figure 5:
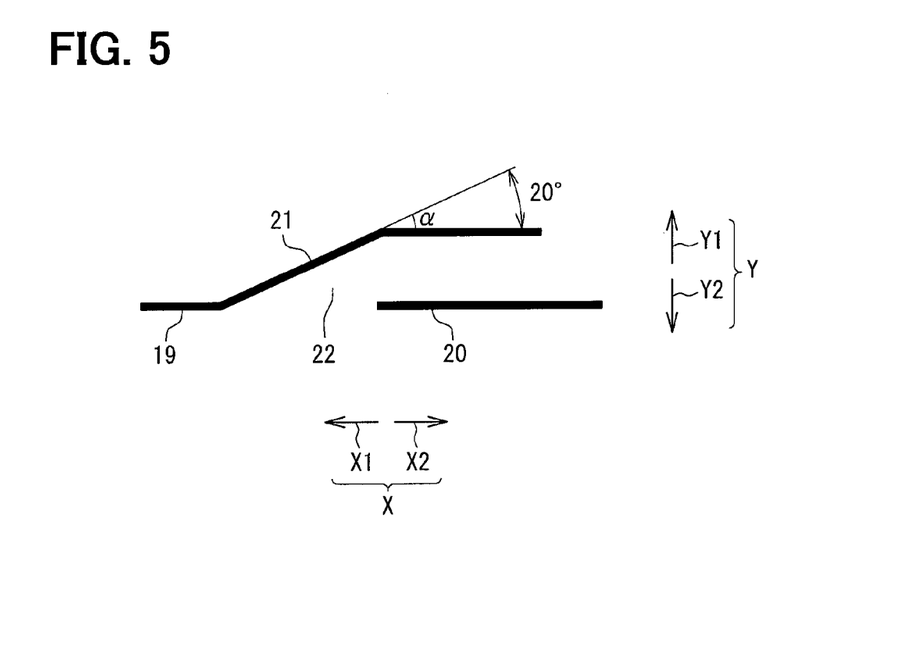
FIG. 5 is a schematic diagram in which an inclination angle of an inclination part is 20 degrees.
Figure 6:
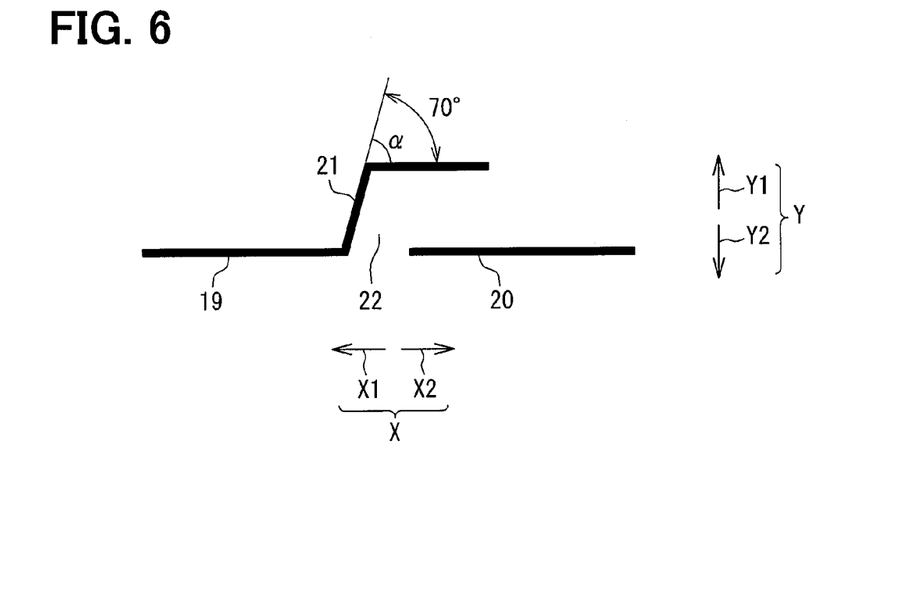
FIG. 6 is a schematic diagram in which an inclination angle of an inclination part is 70 degrees.

The dimension of the inclination part 21 in the radial direction X is larger than the projection dimension of the projection part 20. The tip end of the inclination part 21 is located on the lower side Y2 (adjacent to the second fan 14) in the rotation axis direction Y than the main plate 15 of the first fan 13 is. The tip end of the inclination part 21 represents an end portion of the inclination part 21 located on the inner side X2 (right side in FIG. 2) in the radial direction X. Moreover, as shown in FIG. 3, the clearance La between the projection part 20 and the inclination part 21 in the rotation axis direction Y is set to be smaller than or equal to a clearance Lb between the main plate 15 of the first fan 13 and the main plate 16 of the second fan 14 in the rotation axis direction Y (La≤Lb). In other words, the width La of the leak passage 22 is set to be smaller than or equal to the clearance Lb between the fans 13 and 14. Therefore, air ventilated from the first fan 13 can be restricted from directly flowing into the leak passage 22.

Next, air flow in each of the air passages 17a and 18a is explained using FIG. 2. Arrows shown in FIG. 2 represent the direction of the flow in the section shown in FIG. 2. Actually, air flows also on the back side of FIG. 2. Therefore, in each of the air passages 17a and 18a, air flows in the circumferential direction by circling and turning in the section shown in FIG. 2. As shown in FIG. 2, in the first air passage 17a and the second air passage 18a, a turning flow is formed by the air sent from each fan 13, 14 in a clockwise rotation and a counterclockwise rotation. The air is then sent toward the back side of FIG. 2 from each of the air passages 17a and 18a to the downstream side. The inclination part 21 is inclined to the direction guiding the turning flow in the counterclockwise rotation that is located on the lower side in the first air passage 17a. Therefore, the inclination part 21 can restrict the turning flow from being disturbed on the lower side in the first air passage 17a.

Moreover, the leak flow which passed between the inclination part 21 and the projection parts 20 flows into the second air passage 18a, and joins a flow produced by the second fan 14 that forms the turning flow in the clockwise rotation located on the upper side in the second air passage 18a. Therefore, the turning flow in the second air passage 18a is restricted from being disturbed by the leak flow.

Figure 7:
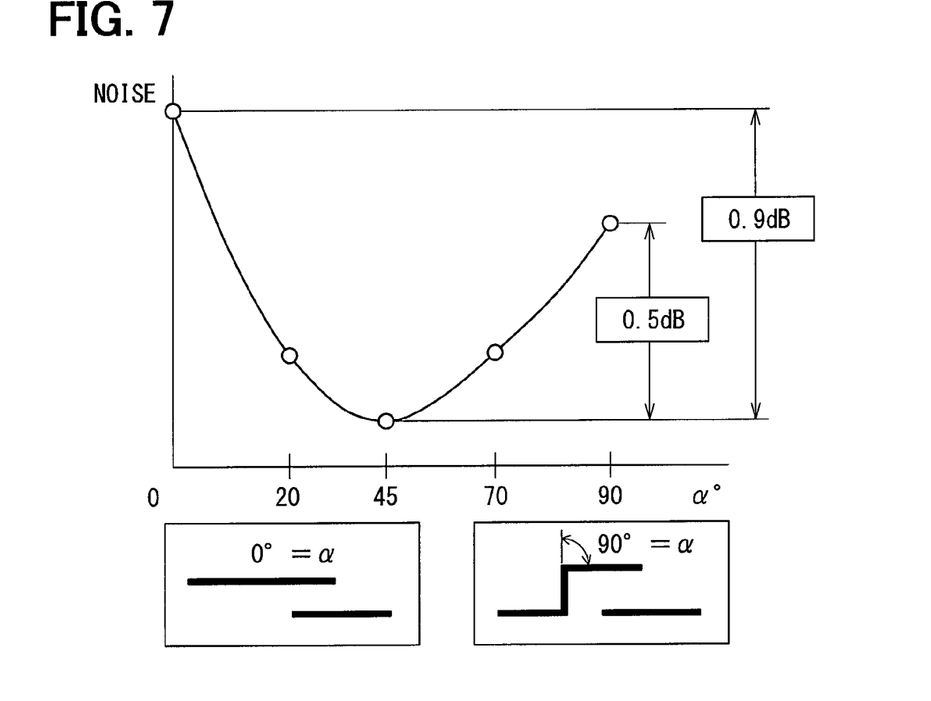
FIG. 7 is a graph illustrating a relationship between an inclination angle of an inclination part and noise.

Next, the inclination angle α of the inclination part 21 is explained using FIGS. 4-7. The inclination angle α of the inclination part 21 to the radial direction X is most desirably 45 degrees (refer to FIG. 4). As shown in FIG. 7, as the inclination angle α is made smaller from 45 degrees, the noise increases. When the inclination angle α is made smaller, the effect of the leak passage 22 guiding the leak flow is reduced, and variation will arise in the flow rate of leak flow, not to be constant. Since the variation in the leak flow changes the flow in the second air passage 18a, the noise becomes large.

Moreover, noise becomes larger as the inclination angle α is increased from 45 degrees. When the inclination angle α is made larger, the inclination part 21 becomes a resistance in the first air passage 17a to affect the turning flow in the first air passage 17a. Moreover, since the advance angle of the leak flow advancing into the second air passage 18a becomes larger in the second air passage 18a, the leak flow easily collides to the turning flow in the second air passage 18a. As a result, the noise becomes larger when the inclination angle α is made larger from 45 degrees. When the inclination angle α is in a range larger than or equal to 20 degrees (refer to FIG. 5) and smaller than or equal to 70 degrees (refer to FIG. 6), the noise level can be suppressed below half of that in case the inclination angle α is 90 degrees. Therefore, as shown in FIG. 7, the inclination angle α of the inclination part 21 is desirably in the range larger than or equal to 20 degrees (refer to FIG. 5) and smaller than or equal to 70 degrees, and the most desirable angle is 45 degrees. Moreover, according to the experimental results as to ventilation efficiency, the ventilation efficiency of fan is improved by 0.5 Pt (0.5%) by setting the inclination angle α as 45 degrees, compared with case where the inclination angle α is 90 degrees. Therefore, the ventilation resistance is reduced when the inclination angle α is 45 degrees.

As explained above, in the fan 11 of this embodiment, the inclination part 21 is defined in the partition wall 19 and the inclination part 21 is inclined, so as not to be a resistance for the turning flow generated by the first fan 13 in the first casing 17. Moreover, the leak flow passing between the inclination part 21 and the projection part 20 to flow from the first fan 13 toward the second fan 14 is guided by the inclination part 21 on the outer side X1 in the radial direction X. Thus, the resistance can be reduced in the air flow produced by the second fan 14 to flow toward the outer side X1 in the radial direction X. Therefore, in the fan 11 of this embodiment, as shown in FIG. 7, the noise and resistance resulting from a leak flow can be reduced. In other words, due to the inclination part 21 and the projection part 20, interference and collision between the leak flow and the main flow can be reduced as much as possible, such that noise can be reduced and efficiency can be raised.

Moreover, in this embodiment, the inclination part 21 is formed to be located adjacent to the first fan 13 across a clearance relative to the projection part 20 of the second fan 14 in the rotation axis direction Y. Therefore, the inclination part 21 has a positional relationship to overlap an area between the first fan 13 and the second fan 14 in the radial direction X. Since the overlap degree overlapping with the first fan 13 in the radial direction X can be reduced, the flow rate of air which flows into the leak passage 22 directly from the first fan 13 can be controlled.

(Second Embodiment)

Figure 8:
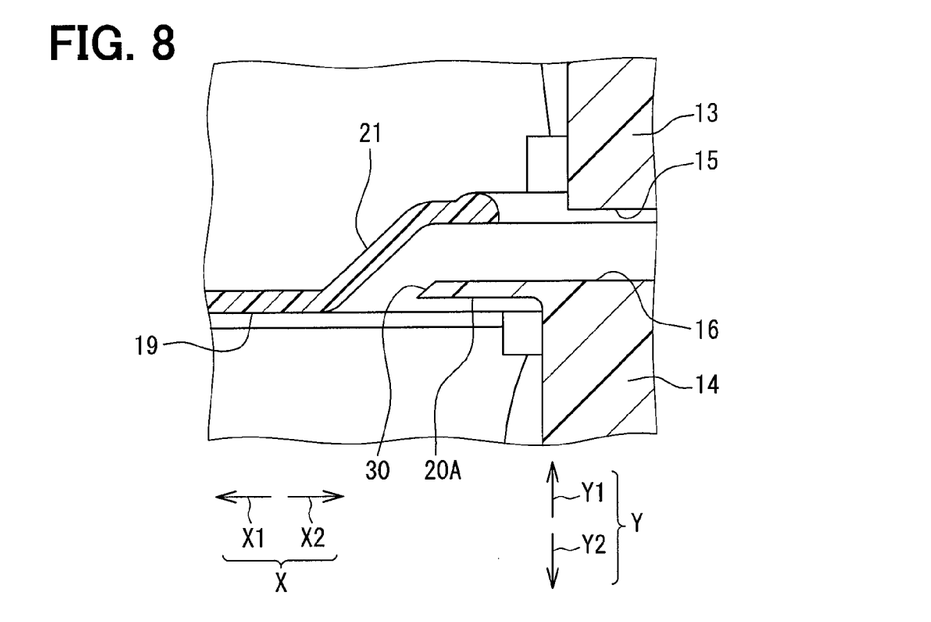
FIG. 8 is an enlarged sectional view illustrating a part of a fan of a second embodiment.

A second embodiment is described with reference to FIG. 8. In the present embodiment, the shape of the tip end 30 of the projection part 20A is featured. As shown in FIG. 8, the tip end 30 of the projection part 20A has a taper shape inclined toward the second fan 14 as extending on the outer side X1 in the radial direction X. In other words, the thickness of the tip end 30 of the projection part 20A becomes thinner to be inclined in the same inclination direction as the inclination part 21. Moreover, the inclination angle of the tip end 30 of the projection part 20A is preferably in the range larger than or equal to 20 degrees and smaller than or equal to 70 degrees, and still more desirably the same inclination angle as the inclination part 21. Thus, the tip end 30 of the projection part 20A can be restricted from becoming ventilation resistance for leak flow, such that noise generation and efficiency lowering can be further restricted.

Although the embodiments are described, the present disclosure may be carried out with various modifications without being restricted to the above embodiments.

The structure described in the embodiment is just example, and the scope of the present disclosure is not limited to the description range. The scope of the present disclosure is defined by the appended claims, and also includes all the modifications within the equivalent meaning and range as the statement of the claims.

In the first embodiment, two fans are provided, and the number of fans may be three or more without restricted to two. For example, as a fan of other embodiment, an inside/outside air two layer type air-conditioner for a vehicle may include at least two fans, a partition wall 19 which divides the two fans, wherein the at least two fans are arranged up and down, an end portion of at least one of the fans has a projection part 20, and the partition wall 19 has an inclination part 21 with a taper to cover the projection part 20.

In the first embodiment, the inclination part 21 is located to distance toward the first fan 13 from the projection part 20A, and may be distanced toward the second fan 14. In this case, the leak flow from the second fan 14 flows into the first air passage 17a.

In the first embodiment, the projection part 20 is defined in the second fan 14, and may be defined in the first fan 13. Therefore, the projection part 20 and the inclination part 21 may be formed to be symmetrical as the first embodiment in the up-and-down direction.

In the first embodiment, the fan 11 is used for an air-conditioner for a vehicle, and may be used for other air-conditioner without restricted to a vehicle.

What is claimed is:

1. A fan for an air conditioner comprising:
   a casing defining an air passage therein;
   a centrifugal type fan housed in the casing to draw air from both sides in a rotation axis direction; and
   a partition wall that divides inside of the casing into a first air passage and a second air passage in the rotation axis direction of the centrifugal type fan, wherein
   the centrifugal type fan has a first fan disposed in the first air passage, and a second fan disposed in the second air passage,
   the first fan and the second fan are configured to be integrally driven by one motor,
   the second fan has an end portion located adjacent to the first fan in the rotation axis direction and a projection part projected from the end portion outward in a radial direction,
   the partition wall has an inclination part which is inclined toward the second fan in the rotation axis direction as extending outward in the radial direction, and
   the inclination part is provided to cover the projection part across a clearance and guides air sent by the first fan from the first air passage to the second air passage.

2. The fan according to claim 1, wherein the inclination part is arranged to distance from the projection part toward the first fan in the rotation axis direction.

3. The fan according to claim 1, wherein the projection part has a tip end portion that is inclined toward the second fan in the rotation axis direction as extending outward in the radial direction.

4. The fan according to any one of claim 1, wherein
   the inclination part is distanced from the projection part toward the first fan, and
   the inclination part has an end portion located on an inner side in the radial direction, and the end portion is located closer to the second fan in the rotation axis direction than an end portion of the first fan located adjacent to the second fan is.

5. The fan according to claim 1, wherein
   the inclination part has an inclination angle relative to the radial direction and the inclination angle is in a range larger than or equal to 20 degrees and smaller than or equal to 70 degrees.

* * * * *